United States Patent
Liu

(10) Patent No.: US 9,031,959 B2
(45) Date of Patent: May 12, 2015

(54) METHOD AND APPARATUS FOR IDENTIFYING APPLICATION PROTOCOL

(75) Inventor: Fang Liu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 41 days.

(21) Appl. No.: 13/696,431

(22) PCT Filed: May 19, 2010

(86) PCT No.: PCT/CN2010/072923
§ 371 (c)(1),
(2), (4) Date: Nov. 6, 2012

(87) PCT Pub. No.: WO2011/143817
PCT Pub. Date: Nov. 24, 2011

(65) Prior Publication Data
US 2013/0054619 A1 Feb. 28, 2013

(51) Int. Cl.
*G06F 17/30* (2006.01)
*H04L 12/26* (2006.01)

(52) U.S. Cl.
CPC ............ *H04L 43/028* (2013.01); *H04L 43/026* (2013.01)

(58) Field of Classification Search
USPC .......................................... 707/748; 709/230
See application file for complete search history.

(56) References Cited

U.S. PATENT DOCUMENTS

| | | | | |
|---|---|---|---|---|
| 6,412,000 | B1* | 6/2002 | Riddle et al. ................... | 709/224 |
| 6,591,299 | B2* | 7/2003 | Riddle et al. ................... | 709/224 |
| 8,494,000 | B1* | 7/2013 | Nadkarni et al. ............. | 370/469 |
| 2002/0186697 | A1* | 12/2002 | Thakkar ........................ | 370/401 |
| 2009/0010259 | A1* | 1/2009 | Sirotkin ........................ | 370/392 |

FOREIGN PATENT DOCUMENTS

CN 101184089 A 5/2008
CN 101488861 A 7/2009

OTHER PUBLICATIONS

International Search Report PCT/ISA/210 for International Application No. PCT/CN2010/072923 dated Jan. 28, 2011.
Sen, S. et al, "Accurate, Scalable In-Network Identification of P2P Traffic Using Application Signatures," *WWW2004*, May 22, 2004.
(Continued)

*Primary Examiner* — Joshua Bullock
(74) *Attorney, Agent, or Firm* — Harness, Dickey & Pierce

(57) ABSTRACT

In an embodiment, the method of identifying an application protocol includes classifying a data packet to be detected into an individual traffic flow, searching for keywords in a valid payload of the traffic flow based upon a keyword database of identifiable application protocols, and determining a keyword weight vector of the traffic flow. The weight of a keyword is related to a location of the keyword in a valid payload of a traffic flow. Similarities between the keyword weight vector of the traffic flow and feature keyword weight vectors of the identifiable application protocols are determined; and an application protocol corresponding to a feature keyword weight vector with the highest similarity to the keyword weight vector of the traffic flow as the application protocol of the traffic flow is deteremined if a condition is satisfied.

14 Claims, 2 Drawing Sheets

(56) References Cited

OTHER PUBLICATIONS

Liang Chen et al., "A Survey of Application Level Protocol Identification Algorithm," School of Computer Science and Engineering, Southeast University, Nanjiing 210096, vol. 34, No. 7, pp. 73-75, 2007.

Jun. 26, 2014 Chinese Office Action issued in corresponding Chinese Application No. 201080065034.9.

* cited by examiner

METHOD AND APPARATUS FOR IDENTIFYING APPLICATION PROTOCOL

FIELD OF THE INVENTION

The present disclosure relates to a network communication technology and particularly to a protocol identification technology.

BACKGROUND OF THE INVENTION

This invention proposes a method for identifying and classifying a protocol type of an application layer in traffic received by an access gateway or other network equipment and devices having a memory and being controlled by a processor that are in a data network such as a TCP/IP network.

Application protocol identification is intended to determine a protocol type of traffic carried over the network. This is a very important technology to provide informative characteristics of network traffic, which is indispensable in various occasions, e.g., effective network planning and designing, a security policy such as legal monitoring and network blocking, Quality of Service (QoS) enforcement such as traffic shaping and service differentiation, charging policy designing, etc.

Today's communication networks generally follow a layered model, e.g., an OSI reference model or a TCP/IP reference model. The TCP/IP reference model is adopted by most data networks and consists of five layers: Physical Layer, Data Link Layer, Network Layer, Transport Layer and Application Layer. Relay nodes, e.g., an access gateway, generally involve only transferring and relaying at the IP layer and have no knowledge of contents carried at upper layers (Transport Layer and Application Layer). However in some scenarios, for example, where a certain type of application is blocked, it is necessary for the relay nodes to find an efficient way to identify and determine a protocol type carried at the application layer.

SUMMARY OF THE INVENTION

Typical solutions of identifying an application protocol generally fall into the following three categories:

Port-Based Protocol Identification

Protocol classification by a port number is the simplest and most traditional method. This method identifies a protocol or application type from a port number carried in the transport layer header. For a standard protocol, the correspondence between the port number and the protocol is defined by the Internet Assigned Number Authority (IANA), for example, the HTTP protocol typically uses the port 80, and the SMTP protocol uses the port 25. For a proprietary protocol, a port number is typically defined by the protocol or application itself. Due to such correspondence between the protocol and the port number, the protocol type can be determined from the port number in the source port and destination port fields in an application layer protocol header e.g., a TCP header.

Although port number-based protocol identification is efficient and easy to implement, it has several obvious drawbacks. 1) In some protocols, an actually used port number is allocated dynamically during a running process. 2) The widespread use of firewalls has enabled some ports far easier to go through a firewall more easily than some others; and thus, in order to ensure connectivity, there is an increasing trend to use popular ports for a proprietary protocol either directly or by encapsulating them into the original protocol. 3) Some protocols explicitly use non-standard ports to avoid being identified, and even some P2P applications allow a user to change a default port, and some others use tunneling and dynamic port selection in combination to avoid being detected. Thus it has been not reliable any longer to identify a protocol just based on a port number.

Payload-Based Protocol Identification

Payload-based classification is to inspect the payload of a protocol in a traffic data packet with a Deep Packet Inspection (DPI) technology. This method involves locating a deterministic character string in an application layer data packet, for example the character string "http/1" corresponds to an application HTTP, and the character string "0xe319010000" corresponds to an eDonkey application. However a single signature is not sufficiently reliable to determine a protocol type, for example, the character string "http/1" may also appear in the Kazza protocol.

In order to improve the accuracy of matching, someone has proposed to use a regular expression for matching. A regular expression provides a flexible and powerful expression form and can provide protocol identification at high accuracy. In a real application, a Deterministic Finite Automata (DFA) is typically used to implement a regular expression. However, full compilation of a regular expression into a Deterministic Finite Automata may lead to an exponential number of DFA states depending on a specific pattern, thus degrading the performance.

Behavior-Based Protocol Identification

Behavior-based protocol identification does not check any content of traffic but instead identifies a protocol from an observed behavior or characteristic of the traffic, e.g., the size of a data packet, the number of connections, etc. Common behavior-based protocol identification is to use a statistical property to identify and classify traffic in terms of an application. For example, one document has proposed to adopt supervised machine-learning to identify internet traffic, and a fundamental classified object is a traffic flow which is represented as one or more data packets between a given pair of hosts. Each traffic flow has several characteristics (parameters) describing its behavior. These parameters constitute an input discriminator for application identification. For example, flow duration, packet inter-arrival time, valid payload size, Fourier Transform of packet inter-arrival time, etc., can act as a discriminator. As claimed in the document, Bayesian machine learning attained the identification rate of 65% but reached the identification rate 95% thanks to the introduction of two improvements, i.e., Kernel Density Estimation (KDE) and a Fast Correlation-Based Filter (FCBF). Also someone has proposed some other statistics-based identification mechanisms.

Although behavior-based protocol identification causes a less performance overhead as compared with content-based protocol identification, it suffers from a number of limitations. 1) Behavior-based protocol identification typically has lower accuracy than that of content-based protocol identification. It has instable accuracy as compared with the payload-based deterministic approach because it depends mainly on a statistical descriptor. 2) In addition, the observed behavior always depends on an external environment, e.g., network type, host processing capability, etc. For example the packet inter-arrival time in a Wireless Local Area Network (WLAN) may be different from that in an Ethernet network. 3) It is relatively easy for a malicious user to avoid being identified by modifying the foregoing traffic parameter, for example, changing the length of a packet with padding or charging the packet inter-arrival time by delaying a packet.

In order to overcome the foregoing drawbacks in the prior art, the invention proposes a method and apparatus for identifying an application protocol based on keyword vector matching.

In an embodiment of the invention, there is provided a method of identifying an application protocol, the method comprising the steps of: A. classifying a data packet to be detected into an individual traffic flow; B. searching for keywords in a valid payload of the traffic flow based upon a keyword database of identifiable application protocols, and determining a keyword weight vector of the traffic flow, wherein a weight of a keyword is related to a location of the keyword in a valid payload of a traffic flow; C. determining similarities between the keyword weight vector of the traffic flow and feature keyword weight vectors of the identifiable application protocols; and D. determining an application protocol corresponding to a feature keyword weight vector with the highest similarity to the keyword weight vector of the traffic flow as the application protocol of the traffic flow if a predetermined condition is satisfied.

In another embodiment of the invention, before the step A, the method of identifying an application protocol further comprising: a. searching for keywords in valid payloads of a plurality of training traffic flows based upon the keyword database of the identifiable application protocols, and determining keyword weight vectors of the plurality of training traffic flows; and b. determining a feature keyword weight vector corresponding to each of the identifiable application protocols according to the keyword weight vectors of the plurality of training traffic flows.

In an embodiment of the invention, there is provided an apparatus for identifying an application protocol, the apparatus comprising: a first device configured to classify a data packet to be detected into an individual traffic flow; a second device configured to search for keywords in a valid payload of the traffic flow based upon a keyword database of identifiable application protocols, and to determine a keyword weight vector of the traffic flow, wherein a weight of a keyword is related to a location of the keyword in a valid payload of a traffic flow; a third device configured to determine similarities between the keyword weight vector of the traffic flow and feature keyword weight vectors of the identifiable application protocols; and a fourth device configured to determine an application protocol corresponding to a feature keyword weight vector with highest similarity to the keyword weight vector of the traffic flow as the application protocol of the traffic flow if a predetermined condition is satisfied.

In an embodiment of the invention, there is provided a network equipment including the foregoing protocol identifying apparatus of the invention.

With the method and apparatus of the invention, the accuracy of identifying a protocol can be improved without introducing any significant performance overhead.

BRIEF DESCRIPTION OF DRAWINGS

The system will be better understood with reference to the following drawings and description. Elements in the drawings are not necessarily drawn to scale, and instead an emphasis is laid on the principle of a typical model. In the drawings, like reference numerals denote corresponding features throughout the various figures.

DETAILED DESCRIPTION OF EMBODIMENTS

Without loss of generality, all the following embodiments of the invention will be applied to a data communication network, e.g., an Internet network.

In the invention, for each application protocol to be identified, a set of keywords that may appear in that protocol will be selected. By way of an example but without any limitation, keywords of the Hyper Text Transport Protocol include "http/", keywords of the File Transport Protocol include "ftp/", etc. The received data packet is classified into an individual traffic flow according to a 5-tuple. The 5-tuple includes a source address, a destination address, a source port number, a destination port number and a transport protocol type. For each individual traffic flow, the keyword weight vector can be obtained by detecting keywords in a valid payload of the traffic flow and matched with feature keyword weight vectors of the identifiable application protocols to thereby identify a protocol of this individual traffic flow.

Figure 1:
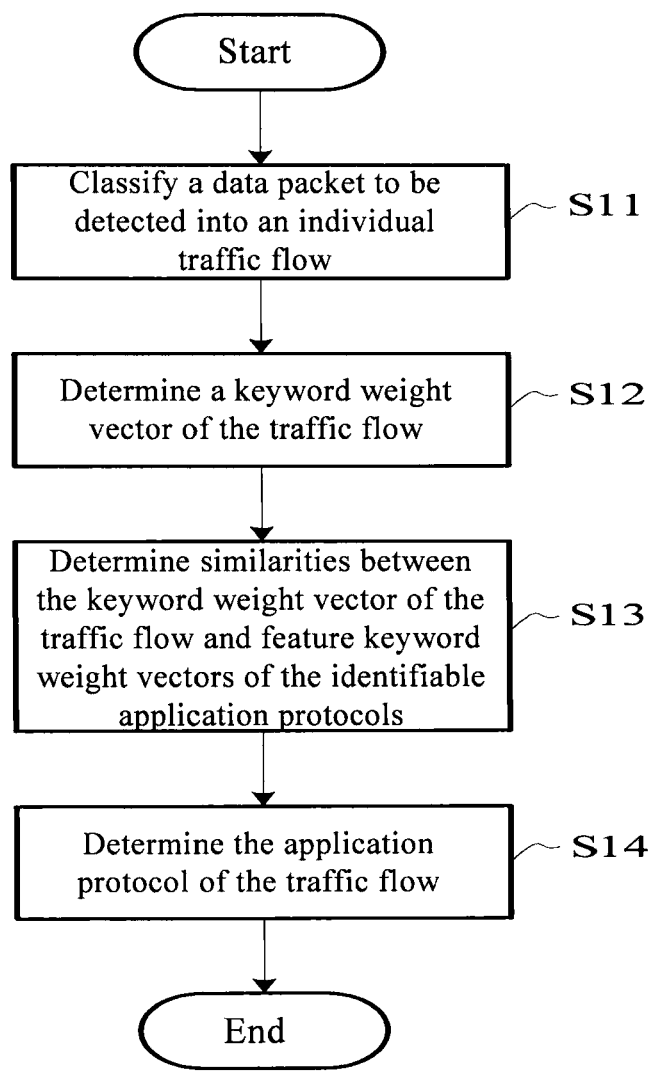
FIG. 1 illustrates a flow chart of a method of identifying an application protocol according to an embodiment of the invention.

FIG. 1 illustrates a flow chart of a method of identifying an application protocol according to an embodiment of the invention. This method is typically applicable to a network equipment of a data communication network that include a memory and are controlled by a processor. As illustrated in FIG. 1, the method of identifying an application protocol includes four steps S11, S12, S13 and S14 in this embodiment.

In the step S11, a data packet to be detected is classified into an individual traffic flow.

In the step S12, a valid payload of the traffic flow is searched for keywords based upon a keyword database of identifiable application protocols, and a keyword weight vector of the traffic flow is determined, where a weight of a keyword is related to a location of the keyword in a valid payload of a traffic flow.

Particularly by way of an example but without any limitation, there are M different keywords in total in the keyword database of the identifiable application protocols, and for each identifiable protocol, several keywords $k_m$, $m \in \{1, \ldots, M\}$ may appear in that protocol. By way of an example but without any limitation, keywords of the Hyper Text Transport Protocol include "http/", keywords of the File Transport Protocol include "ftp/", etc. For example, a keyword weight vector of a traffic flow $f_d$ can be represented as $v_d$.

In the step S13, similarities between the keyword weight vector of the traffic flow and feature keyword weight vectors of the identifiable application protocols are determined.

Particularly by way of an example but without any limitation, there are N identifiable protocols in total, and a feature keyword weight vector of each identifiable protocol can be represented as $V_n$, $n \in \{1, \ldots, N\}$.

In the step S14, an application protocol corresponding to a feature keyword weight vector with the highest similarity to the keyword weight vector of the traffic flow is determined as the application protocol of the traffic flow if a predetermined condition is satisfied.

Those skilled in the art shall appreciate that different identifiable protocols can have the same keywords or can alternatively have keywords which do not overlap with each other; and values of N and M may not have a necessary relationship in term of their magnitudes. Preferably each identifiable application protocol has at least one unique keyword, so M≥N and thus differentiation between the different protocols can be improved.

In an embodiment of the invention, particularly, the data packet to be detected is classified into an individual traffic flow according to a 5-tuple in the step S11, and the 5-tuple includes a source address, a destination address, a source port number, a destination port number and a transport protocol type. It shall be appreciated that data packets for carrying data of the same application between a source (node) and a destination (node) shall have the same source address, destination address, source port number, destination port number and transport protocol type. Typically, data packets of different applications have different source port numbers and destination port numbers; and data packets between different sources (source nodes) and destinations (destination nodes) have different source addresses and destination addresses. Thus different data packets with the same 5-tuple content shall belong to the same application between a pair of source and destination and will be classified into the same individual traffic flow.

In an embodiment of the invention, particularly the similarity in the step 13 includes a cosine similarity. For example, the cosine similarity between the keyword weight vector $v_d$ of the traffic flow $f_d$ and the feature keyword weight vector of any identifiable protocol will be calculated respectively, possibly in the formula of:

$$\cos(v_d, V_n) = \frac{v_d \cdot V_n}{\|v_d\| \times \|V_n\|}.$$

In an embodiment of the invention, particularly the predetermined condition includes the highest similarity being above a predetermined value in the step S14. For example, the cosine similarity between the keyword weight vector $v_d$ of the traffic flow $f_d$ and a feature keyword weight vector $V_2$ is the highest, and then an application protocol represented by $V_2$ will be determined as the application protocol of the traffic flow $f_d$ when that highest similarity is above a predetermined value; and then the traffic flow $f_d$ will be identified as an unknown application, that is, the traffic flow $f_d$ will be determined as not belonging to any identifiable protocol, when the highest similarity is below the predetermined value.

In an embodiment of the invention, particularly a keyword, which appears earlier in a valid payload of a traffic flow for the first time, has a larger weight in the step S12.

Figure 2:
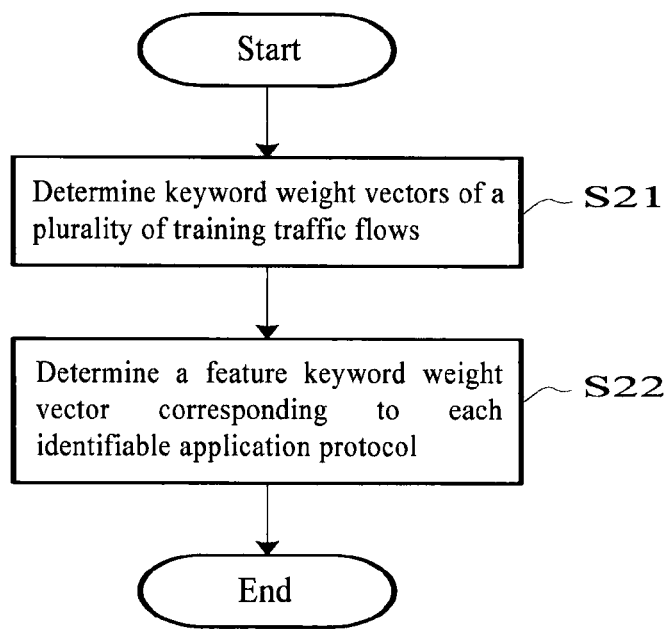
FIG. 2 illustrates a flow chart of determining a feature keyword weight vector in the method of identifying an application protocol according to an embodiment of the invention.

Typically the identification process includes the foregoing steps S11, S12, S13 and S14, and the feature key weight vector of each identifiable protocol shall be determined in a training process prior to the identification process. FIG. 2 illustrates a flow chart of determining a feature keyword weight vector, that is, a training process, in the method of identifying an application protocol according to an embodiment of the invention. As illustrated, this training process includes two steps S21 and S22.

In the step S21, valid payloads of a plurality of training traffic flows are searched for keywords based upon a keyword database of identifiable application protocols, and keyword weight vectors of the plurality of training traffic flows are determined.

In the step S22, a feature keyword weight vector corresponding to each identifiable application protocol is determined according to the keyword weight vectors of the plurality of training traffic flows.

Particularly the application protocol of each training traffic flow is pre-known, so keyword weight vectors of all the training traffic flows belonging to the same application protocol can be averaged to determine the feature keyword weight vector corresponding to the application protocol.

In an embodiment of the invention, particularly a keyword, which appears earlier in a valid payload of a traffic flow for the first time, has a larger weight in the step S21.

More particularly the weight of a keyword is detected by the following itp-idf (inverse text position-inverse document frequency) algorithm in the step S21 of an embodiment of the invention, and the weight of the $i^{th}$ keyword for the $j^{th}$ training traffic flow is represented as:

$$\omega_{ij} = itp_{ij} \times idf_i \quad (1)$$

where $itp_{ij}$ is the metric of the inverse text position, $idf_i$ is the metric of the inverse document frequency; and $$itp_{ij} = 1/o_{ij} \quad (2)$$

where $o_{ij}$ represents the location where the $i^{th}$ keyword $k_i$ appears in the $j^{th}$ training traffic flow for the first time, and this location can be the bit location or the byte location; and $itp_{ij}$ represents the reciprocal of $o_{ij}$ and will take the value of zero if the $i^{th}$ keyword $k_i$ does not appear in the $j^{th}$ training traffic flow;

$$idf_i = \log \frac{|F|}{|\{f : k_i \in f\}|} \quad (3)$$

where $|F|$ represents the total amount of the training traffic flows, and $|\{f:k_i \in f\}|$ represents the amount of the traffic flows including the $i^{th}$ keyword $k_i$, and then the keyword weight vector of the $j^{th}$ training traffic flow can be represented as:

$$v_j = (\omega_{1j}, \omega_{2j}, \ldots, \omega_{Mj}) \quad (4)$$

where M represents the total amount of keywords in the keyword database.

In the step S22, a feature keyword weight vector corresponding to each identifiable application protocol is determined according to the keyword weight vectors of the plurality of training traffic flows. For a specific identifiable application protocol p, a feature keyword weight vector can be calculated from given training traffic flows or can be referred to as a centroid vector represented as:

$$V_p = \frac{1}{|F_p|} \sum_{v_j \in F_p} v_j \quad (5)$$

where $F_p$ represents the set of training traffic flows belonging to the protocol p, $|F_p|$ represents the amount of training traffic flows belonging to the protocol p, and $v_j$ represents the keyword weight vector of a traffic flow in the set $F_p \cdot V_p$ can be derived by averaging weights of respective keywords appearing in keyword weight vectors of respective training traffic flows in the set $F_p$.

The feature keyword weight vector of each identifiable application protocol can be calculated easily based upon the training traffic flows in the foregoing formulas (1) to (5) in the steps S21 and S22 of this embodiment.

Those skilled in the art shall appreciate that the training traffic flows are also generated by classifying a large number of training data packets according to a 5-tuple; and the training traffic flows shall include several traffic flows of each identifiable application.

Those skilled in the art shall appreciate that the foregoing training process, that is, the step S21 and the step S22, can be repeated periodically or non-periodically, each time for updated training traffic flows to update the feature keyword weight vectors of the identifiable application protocols. A new identifiable application protocol can be introduced in a specific training process for updating; and accordingly the number of keywords in the keyword database may be increased, the updated training traffic flows shall further include several traffic flows of the newly introduced identifiable application protocol, and the updating result can further include a feature keyword weight vector of the newly introduced identifiable application protocol.

Those skilled in the art shall appreciate that the keyword weight vector of a traffic flow will be determined in the step S12 in the identification process in the same algorithm as in the step S21 in the training process.

In an embodiment of the invention, particularly the keyword weight vector $v_d$ of a traffic flow $f_d$ is detected by the following itp-idf algorithm in the step 12, and the weight of the $i^{th}$ keyword for the traffic flow $f_d$ is represented as $\omega_{id}=\text{itp}_{id}\times\text{idf}_i$, where $\text{itp}_{id}=1/o_{id}$; where $o_{id}$ represents the location where the $i^{th}$ keyword $k_i$ appears in the traffic flow $f_d$ for the first time, and this location can be the bit location or the byte location; and $\text{itp}_{id}$ represents the reciprocal of $o_{id}$ and will take the value of zero if the $i^{th}$ keyword $k_i$ does not appear in the traffic flow $f_d$, where:

$$idf_i = \log\frac{|F|}{|\{f:k_i \in f\}|},$$

where $|F|$ represents the total amount of the training traffic flows, and $|\{f:k_i \in f\}|$ represents the amount of the traffic flows including the $i^{th}$ keyword $k_i$, and then the keyword weight vector of the traffic flow $f_d$ can be represented as $v_d=(\omega_{1d}, \omega_{2d}, \ldots, \omega_{Md})$, where M represents the total amount of keywords in the keyword database.

For a traffic flow, the keyword that plays an important role in identifying a protocol of the traffic flow is typically located in the header of a valid payload of the traffic flow. In an embodiment of the invention, particularly the keyword weight vector of a traffic flow or a training traffic flow will be determined from the content of a predetermined length in the header of a valid payload of the traffic flow in the step S12 or the step S21, and it will suffice if only the content of the predetermined length in the header of the valid payload is searched for a keyword and a weight is calculated from only that content. By way of an example but without any limitation, the predetermined length is 128 bytes or 256 bytes. Those skilled in the art shall appreciate that the content of the predetermined length in the header of the valid payload can be carried in one or more data packets.

Figure 3:
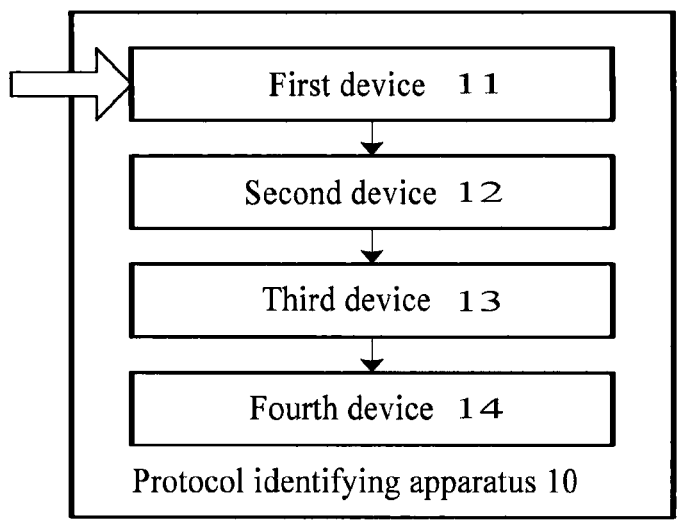
FIG. 3 illustrates a structural diagram of a protocol identifying apparatus according to an embodiment of the invention.

FIG. 3 illustrates a structural diagram of a protocol identifying apparatus according to an embodiment of the invention. As illustrated, the protocol identifying apparatus 10 in this embodiment includes a first device 11, a second device 12, a third device 13 and a fourth device 14. The protocol identifying apparatus 10 is typically arranged in a network equipment in a data communication network.

The first device 11 is configured to classify a data packet to be detected into an individual traffic flow.

The second device 12 is configured to search a valid payload of the traffic flow for keywords based upon a keyword database of identifiable application protocols and to determine a keyword weight vector of the traffic flow, where a weight of a keyword is related to a location of the keyword in a valid payload of a traffic flow.

Particularly by way of an example but without any limitation, there are M different keywords in total in the keyword database of the identifiable application protocols, and for each identifiable protocol, several keywords $k_m$, $m\in\{1, \ldots, M\}$ may appear in that protocol. By way of an example but without any limitation, keywords of the Hyper Text Transport Protocol include "http/", keywords of the File Transport Protocol include "ftp/", etc. For example, a keyword weight vector of a traffic flow $f_d$ can be represented as $v_d$.

The third device 13 is configured to determine similarities between the keyword weight vector of the traffic flow and feature keyword weight vectors of the identifiable application protocols.

Particularly by way of an example but without any limitation, there are N identifiable protocols in total, and a feature keyword weight vector of each identifiable protocol can be represented as $V_n$, $n\in\{1, \ldots, N\}$.

The fourth device 14 is configured to determine an application protocol corresponding to a feature keyword weight vector with the highest similarity to the keyword weight vector of the traffic flow as the application protocol of the traffic flow if a predetermined condition is satisfied.

Those skilled in the art shall appreciate that different identifiable protocols can have the same keywords or can alternatively have keywords which do not overlap with each other; and values of N and M may not have a necessary relationship in term of their magnitudes. Preferably each identifiable application protocol has at least one unique keyword, so M≥N and thus differentiation between the different protocols can be improved.

In an embodiment of the invention, particularly, the data packet to be detected is classified into an individual traffic flow according to a 5-tuple in the first device 11, and the 5-tuple includes a source address, a destination address, a source port number, a destination port number and a transport protocol type. It shall be appreciated that data packets for carrying data of the same application between a source (node) and a destination (node) shall have the same source address, destination address, source port number, destination port number and transport protocol type. Typically, data packets of different applications have different source port numbers and destination port numbers; and data packets between different sources (source nodes) and destinations (destination nodes) have different source addresses and destination addresses. Thus different data packets with the same 5-tuple content shall belong to the same application between a pair of source and destination and will be classified into the same individual traffic flow.

In an embodiment of the invention, particularly the similarity determined by the third device 13 includes a cosine similarity. For example, the cosine similarity between the keyword weight vector $v_d$ of the traffic flow $f_d$ and the feature keyword weight vector of any identifiable protocol will be calculated respectively, possibly in the formula of:

$$\cos(v_d, V_n) = \frac{v_d \cdot V_n}{\|v_d\| \times \|V_n\|}.$$

In an embodiment of the invention, particularly the predetermined condition in the fourth device 14 includes the highest similarity being above a predetermined value. For example, the cosine similarity between the keyword weight vector $v_d$ of the traffic flow $f_d$ and a feature keyword weight vector $V_2$ is the highest, and then an application protocol represented by $V_2$ will be determined as the application protocol of the traffic flow $f_d$ when that highest similarity is above a predetermined value; and then the traffic flow $f_d$ will be identified as an unknown application, that is, the traffic flow $f_d$ will be determined by the fourth device 14 as not belonging to any identifiable protocol, when the highest similarity is below the predetermined value.

In an embodiment of the invention, particularly a keyword, which appears earlier in a valid payload of a traffic flow for the first time, has a larger weight in the second device 12.

Typically the identification process includes the operations performed respectively by the foregoing first device 11, second device 12, third device 13 and fourth device 14, and the feature key weight vector of each identifiable protocol shall be determined in a training process prior to the identification process.

The training process is performed by the second device 12 and includes two sub-operations 21 and 22 (not illustrated).

In the sub-operation 21, the second device 12 searches for keywords in valid payloads of a plurality of training traffic flows based upon a keyword database of identifiable application protocols and determines keyword weight vectors of the plurality of training traffic flows.

In the sub-operation 22, the second device 12 determines a feature keyword weight vector corresponding to each identifiable application protocol according to the keyword weight vectors of the plurality of training traffic flows. Particularly the application protocol of each training traffic flow is pre-known, so keyword weight vectors of all the training traffic flows belonging to the same application protocol can be averaged to determine the feature keyword weight vector corresponding to the application protocol.

In an embodiment of the invention, particularly a keyword, which appears earlier in a valid payload of a traffic flow for the first time, has a larger weight in the sub-operation 21 performed by the second device 12.

More particularly in an embodiment of the invention, the weight of a keyword is detected by the following itp-idf (inverse text position-inverse document frequency) algorithm in the sub-operation 21 performed by the second device 12, and the weight of the $i^{th}$ keyword for the $j^{th}$ training traffic flow is represented as:

$$\omega_{ij} = itp_{ij} \times idf_i \qquad (1)$$

where $itp_{ij}$ is the metric of the inverse text position, $idf_i$ is the metric of the inverse document frequency; and $$itp_{ij} = 1/o_{ij} \qquad (2)$$

where $o_{ij}$ represents the location where the $i^{th}$ keyword $k_i$ appears in the $j^{th}$ training traffic flow for the first time, and this location can be the bit location or the byte location; and $itp_{ij}$ represents the reciprocal of $o_{ij}$ and will take the value of zero if the $i^{th}$ keyword $k_i$ does not appear in the $j^{th}$ training traffic flow;

$$idf_i = \log \frac{|F|}{|\{f : k_i \in f\}|} \qquad (3)$$

where $|F|$ represents the total amount of the training traffic flows, and $|\{f:k_i \epsilon f\}|$ represents the amount of the traffic flows including the $i^{th}$ keyword $k_i$, and then the keyword weight vector of the $j^{th}$ training traffic flow can be represented as:

$$v_j = (\omega_{1j}, \omega_{2j}, \ldots, \omega_{Mj}) \qquad (4)$$

where M represents the total amount of keywords in the keyword database.

In the sub-operation 22, the second device 12 determines a feature keyword weight vector corresponding to each identifiable application protocol according to the keyword weight vectors of the plurality of training traffic flows. For a specific identifiable application protocol p, a feature keyword weight vector can be calculated from given training traffic flows or can be referred to as a centroid vector represented as:

$$V_p = \frac{1}{|F_p|} \sum_{v_j \in F_p} v_j \qquad (5)$$

where $F_p$ represents the set of training traffic flows belonging to the protocol p, $|F_p|$ represents the amount of training traffic flows belonging to the protocol p, and $v_j$ represents the keyword weight vector of a traffic flow in the set $F_p \cdot V_p$ can be derived by averaging weights of respective keywords appearing in keyword weight vectors of respective training traffic flows in the set $F_p$.

In this embodiment, the feature keyword weight vector of each identifiable application protocol can be calculated easily based upon the training traffic flows in the foregoing formulas (1) to (5) in the sub-operations 21 and 22 performed by the second device 12.

Those skilled in the art shall appreciate that the training traffic flows are also generated by classifying a large number of training data packets according to a 5-tuple; and the training traffic flows shall include several traffic flows of each identifiable application.

Those skilled in the art shall appreciate that the foregoing training process, that is, the sub-operation 21 and the sub-operation 22 performed by the second device 12, can be repeated periodically or non-periodically, each time for updated training traffic flows to update the feature keyword weight vectors of the identifiable application protocols. A new identifiable application protocol can be introduced in a specific training process for updating; and accordingly the number of keywords in the keyword database may be increased, the updated training traffic flows shall further include several traffic flows of the newly introduced identifiable application protocol, and the updating result can further include a feature keyword weight vector of the newly introduced identifiable application protocol.

Those skilled in the art shall appreciate that the second device 12 will determine the keyword weight vector of a traffic flow in the identification process in the same algorithm as in the sub-operation 21 in the training process.

In an embodiment of the invention, particularly the second device 12 detects the keyword weight vector $v_d$ of a traffic flow $f_d$ by the following itp-idf algorithm in the identification process, and the weight of the $i^{th}$ keyword for the traffic flow $f_d$ is represented as $\omega_{id} = itp_{id} \times idf_i$, where $itp_{id} = 1/o_{id}$; where $o_{id}$ represents the location where the $i^{th}$ keyword $k_i$ appears in the traffic flow $f_d$ for the first time, and this location can be the bit location or the byte location; and $itp_{id}$ represents the reciprocal of $o_{id}$ and will take the value of zero if the $i^{th}$ keyword $k_i$ does not appear in the traffic flow $f_d$, where:

$$idf_i = \log \frac{|F|}{|\{f : k_i \in f\}|},$$

where |F| represents the total amount of the training traffic flows, and |{f:k$_i$ef}| represents the amount of the traffic flows including the i$^{th}$ keyword k$_i$, and then the keyword weight vector of the traffic flow f$_d$ can be represented as v$_d$=(ω$_{1d}$, ω$_{2d}$, . . . , ω$_{Md}$), where M represents the total amount of keywords in the keyword database.

For a traffic flow, the keyword that plays an important role in identifying a protocol of the traffic flow is typically located in the header of a valid payload of the traffic flow. In an embodiment of the invention, particularly the keyword weight vector of a traffic flow or a training traffic flow will be determined from the content of a predetermined length in the header of a valid payload of the traffic flow in the operation of determining the keyword weight vector in the identification process or the sub-operation 21 in the training process of the second device 11, and it will suffice if the second device 12 searches only the content of the predetermined length in the header of the valid payload for a keyword and calculates a weight from only that content. By way of an example but without any limitation, the predetermined length is 128 bytes or 256 bytes. Those skilled in the art shall appreciate that the content of the predetermined length in the header of the valid payload can be carried in one or more data packets.

In an embodiment of the invention, there is provided a network device in which the foregoing protocol identifying apparatus 10 is arranged. The network device is, for example, but will not be limited to a switch, a router, a gateway, an end device, etc.

Those skilled in the art shall appreciate that the apparatus as referred to in the invention can include a software function module, a hardware module or a combination of both.

Those skilled in the art shall appreciate that the foregoing embodiments are illustrative but not limiting. Different technical features appearing in different embodiments can be combined to advantage. Those skilled in the art shall appreciate and implement other variant embodiments of the disclosed embodiments upon review of the drawings, the description and the claims. In the claims, the term "comprising" will not preclude another device(s) or step(s); the indefinite article "a/an" will not preclude plural; and the terms "first", "second", etc., are intended to designate a name but not to represent any specific order. Any reference numerals in the claims shall not be construed as limiting the scope of the invention. Functions of a plurality of parts appearing in a claim can be performed by a separate module in hardware or software. The mere fact that some technical features appear in different dependent claims will not mean that these technical features can not be combined to advantage.

The invention claimed is:

1. A method of identifying an application protocol, the method comprising:
   A. classifying a data packet to be detected into an individual traffic flow;
   B. searching for keywords in a valid payload of the traffic flow based upon a keyword database of identifiable application protocols, and determining a keyword weight vector of the traffic flow, wherein a weight of a keyword is related to a location of the keyword in a valid payload of a traffic flow;
   C. determining similarities between the keyword weight vector of the traffic flow and feature keyword weight vectors of the identifiable application protocols; and
   D. determining an application protocol corresponding to a feature keyword weight vector with the highest similarity to the keyword weight vector of the traffic flow as the application protocol of the traffic flow if a predetermined condition is satisfied.

2. The method according to claim 1, wherein a keyword, which appears earlier in a valid payload of a traffic flow for a first time, has a larger weight in the step B.

3. The method according to claim 2, wherein a weight of an i$^{th}$ keyword in a key weight vector of a traffic flow f$_d$ is represented as ω$_{id}$=itp$_{id}$×idf$_i$;
   wherein itp$_{id}$=1/o$_{id}$, o$_{id}$ represents a location where the i$^{th}$ keyword appears in the traffic flow f$_d$ for a first time; and
   wherein $$idf_i = \log\frac{|F|}{|\{f:k_i \in f\}|},$$

|F| represents a total amount of traffic flows, and |{f: k$_i$ef}| represents an amount of traffic flows including the i$^{th}$ keyword k$_i$.

4. The method according to claim 1, wherein before the step A, the method further comprises:
   a. searching for keywords in valid payloads of a plurality of training traffic flows based upon the keyword database of the identifiable application protocols, and determining keyword weight vectors of the plurality of training traffic flows; and
   b. determining a feature keyword weight vector corresponding to each of the identifiable application protocols according to the keyword weight vectors of the plurality of training traffic flows.

5. The method according to claim 4, wherein the keyword weight vectors of the plurality of training traffic flows are determined in the step a using the same algorithm as in the step B; and
   wherein a weight of an ith keyword in a key weight vector of a j$^{th}$ traffic flow is represented as ω$_{ij}$=itp$_{ij}$×idf$_i$;
   wherein itp$_{ij}$=1/o$_{ij}$, o$_{ij}$, represents a location where the i$^{th}$ keyword appears in the J$^{th}$ traffic flow for a first time; and
   wherein $$idf_i = \log\frac{|F|}{|\{f:k_i \in f\}|},$$

|F| represents a total amount of the traffic flows, and |{f :k$_i$ef }| represents an amount of the traffic flows including the i$^{th}$ keyword k$_i$.

6. The method according to claim 1, wherein the data packet to be detected is classified according to a 5-tuple of the data packet in the step A, and the 5-tuple includes a source address, a destination address, a source port number, a destination port number and a transport protocol type; and the similarity in the step C includes a cosine similarity.

7. The method according to claim 1, wherein the predetermined condition includes the highest similarity being above a predetermined value.

8. An apparatus for identifying an application protocol, the apparatus comprising:
   a first device, in network equipment controlled by a processor, configured to classify a data packet to be detected into an individual traffic flow;
   a second device, in the network equipment controlled by the processor, configured to search for keywords in a valid payload of the traffic flow based upon a keyword database of identifiable application protocols, and to determine a keyword weight vector of the traffic flow, wherein a weight of a keyword is related to a location of the keyword in a valid payload of a traffic flow;

a third device, in the network equipment controlled by the processor, configured to determine similarities between the keyword weight vector of the traffic flow and feature keyword weight vectors of the identifiable application protocols; and a fourth device, in the network equipment controlled by the processor, configured to determine an application protocol corresponding to a feature keyword weight vector with highest similarity to the keyword weight vector of the traffic flow as the application protocol of the traffic flow if a predetermined condition is satisfied.

9. The protocol identifying apparatus according to claim 8, wherein a keyword, which appears earlier in a valid payload of a traffic flow for a first time, has a larger weight in the second device.

10. The protocol identifying apparatus according to claim 9, wherein a weight of an $i^{th}$ keyword in a key weight vector of a traffic flow $f_d$ is represented as $\omega_{id}=\mathrm{itp}_{id}\times\mathrm{idf}_i$;

wherein $\mathrm{itp}_{id}=1/o_{id}$, $o_{id}$ represents a location where the $i^{th}$ keyword appears in the traffic flow $f_d$ for a first time; and wherein $$idf_i = \log\frac{|F|}{|\{f:k_i \in f\}|},$$

|F| represents a total amount of traffic flows, and $|\{f:k_i\epsilon f\}|$ represents an amount of traffic flows including the $i^{th}$ keyword $k_i$.

11. The protocol identifying apparatus according to claim 8, wherein before the step A, wherein the second device is further configured:

to search for keywords in valid payloads of a plurality of training traffic flows based upon the keyword database of the identifiable application protocols, and to determine keyword weight vectors of the plurality of training traffic flows; and to determine a feature keyword weight vector corresponding to each of the identifiable application protocols according to the keyword weight vectors of the plurality of training traffic flows.

12. The protocol identifying apparatus according to claim 11, wherein the second device determines the keyword weight vectors of the plurality of training traffic flows and the traffic flow of the data packet to be detected using the same algorithm; and wherein a weight of an $i^{th}$ keyword in a key weight vector of a $j^{th}$ traffic flow is represented as $\omega_{ij}=\mathrm{itp}_{ij}\times\mathrm{idf}_i$;

wherein $\mathrm{itp}_{ij}=1/o_{ij}$, $o_{ij}$ represents a location where the $i^{th}$ keyword appears in the $j^{th}$ traffic flow for a first time; and wherein $$idf_i = \log\frac{|F|}{|\{f:k_i \in f\}|},$$

|F| represents a total amount of the traffic flows, and $|\{f:k_i\epsilon f\}|$ represents an amount of the traffic flows including the $i^{th}$ keyword $k_i$.

13. The protocol identifying apparatus according to claim 8, wherein the first device classifies the data packet to be detected according to a 5-tuple of the data packet, and the 5-tuple includes a source address, a. destination address, a source port number, a destination port number and a transport protocol type; and the similarity in the third device includes a cosine similarity.

14. The protocol identifying apparatus according to claim 8, wherein the predetermined condition includes the highest similarity being above a predetermined value.

* * * * *